(12) United States Patent  
Shiwaku et al.

(10) Patent No.: US 7,024,566 B2
(45) Date of Patent: Apr. 4, 2006

(54) INFORMATION TERMINAL

(75) Inventors: Yoshiyuki Shiwaku, Osaka (JP); Takeshi Mori, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 646 days.

(21) Appl. No.: 09/940,632

(22) Filed: Aug. 29, 2001

(65) Prior Publication Data

US 2002/0184541 A1     Dec. 5, 2002

(30) Foreign Application Priority Data

May 29, 2001     (JP) ............................. 2001-160302

(51) Int. Cl.
*H05K 5/00*     (2006.01)
*H05K 7/00*     (2006.01)

(52) U.S. Cl. ...................... 713/300; 348/375; 361/737; 361/747; 70/14; 70/18; 70/58

(58) Field of Classification Search ................ 713/300; 70/58, 18, 14; 348/375, 231.7; 361/737, 361/747
See application file for complete search history.

(56) References Cited

U.S. PATENT DOCUMENTS

| | | | | |
|---|---|---|---|---|
| 4,794,587 A | * | 12/1988 | Cordiano | 369/292 |
| 4,986,618 A | * | 1/1991 | Wakatsuki | 312/276 |
| 5,255,154 A | * | 10/1993 | Hosoi et al. | 361/681 |
| 6,088,229 A | * | 7/2000 | Seto et al. | 361/726 |
| 6,210,193 B1 | * | 4/2001 | Ito et al. | 439/326 |
| 6,321,579 B1 | * | 11/2001 | Reyes | 70/58 |
| 6,331,934 B1 | * | 12/2001 | Helot et al. | 361/686 |
| 6,493,033 B1 | * | 12/2002 | Glogan et al. | 348/375 |

* cited by examiner

*Primary Examiner*—A. Elamin
(74) *Attorney, Agent, or Firm*—Wenderoth, Lind & Ponack, L.L.P.

(57) ABSTRACT

An information terminal incorporating a function of a mobile phone is provided in which a subscriber ID card used in a GSM system or the like is prevented from being stolen. When a key is inserted in the key hole of a cylinder lock and turned by 90 degrees, the cam plate is turned to rotate a lever of the rotation arresting shaft through a coupling rod plate, and the arresting part is turned by 90 degrees in a lock part of a groove at the back side of a slide lock device. As a result, the slide lock device is prevented from sliding, and the arrested part is kept arrested by the arresting part. Therefore, a back lid cannot be opened, and the cam plate locks a power source lever, so that a power switch cannot be turned on.

15 Claims, 4 Drawing Sheets

INFORMATION TERMINAL

FIELD OF THE INVENTION

The present invention relates to an information terminal such as a personal computer or the like incorporating a wireless function such as a mobile phone, and more particularly to an information terminal with an anti-theft function for an IC memory device or the like used for a wireless function.

BACKGROUND OF THE INVENTION

Recently, a wireless function such as a mobile phone is built in an information terminal such as a laptop computer and is used for exchanging information externally. The global system for mobile communication (GSM) is a mobile phone system used widely overseas, except Japan, such as in Europe, Asia and North America. A feature of this system is to separate a mobile phone terminal and an operator by using a subscriber identity module (SIM) card. In this system, when a user purchases a mobile phone, he/she selects first a mobile phone (terminal) and then selects an arbitrary company as the operator to be used.

At this moment, the operator issues an IC card called the SIM card in which the subscriber information (telephone number) is written. The user contracts with an arbitrary operator, and receives the SIM card, loads the card into the mobile phone terminal, and has the terminal ready to use immediately. If using a different terminal, the user exchanges the SIM card, and the other terminal can be used with the same telephone number. The user, upon having another SIM card issued by another operator, can select plural operators for one terminal.

The SIM card contains the telephone subscriber's right, and thus, if stolen, the card may be used illegally. If incorporated in the device, the SIM card may be rarely stolen. However, for the type of usage where a card is selected from plural SIM cards, and is removed from one terminal and inserted into another terminal, it must be easy to insert and remove the card.

SUMMARY OF THE INVENTION

An information terminal, which can have a SIM card or other memory card easily inserted and removed, is provided with an anti-theft function. The terminal includes the following:

a case having a section for accommodating a detachable memory device;

a locking device provided in the case, which is changed between a locked state and an unlocked state with a key;

a lid for covering the section for accommodating the memory device in the case; and an interlocking lock-mechanism for interlocking with the locking device for closing the lid in the locked state and opening the lid in the unlocked state.

DESCRIPTION OF THE PREFERRED EMBODIMENTS

Embodiment 1

Figure 1:
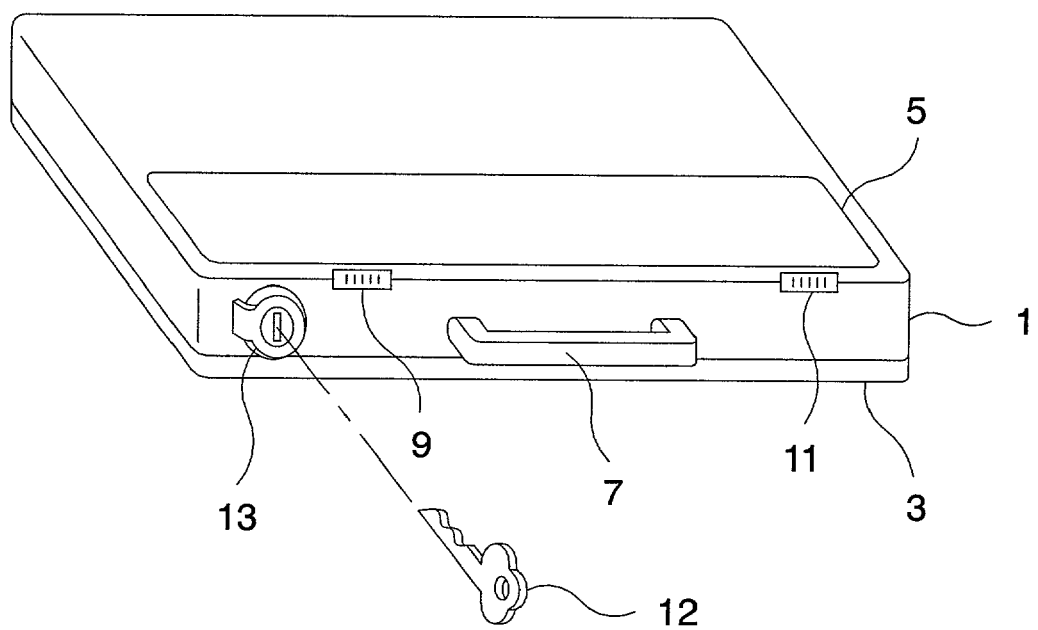
FIG. 1 is a perspective bottom view of an information terminal according to exemplary embodiment 1 of the present invention.
Figure 2:
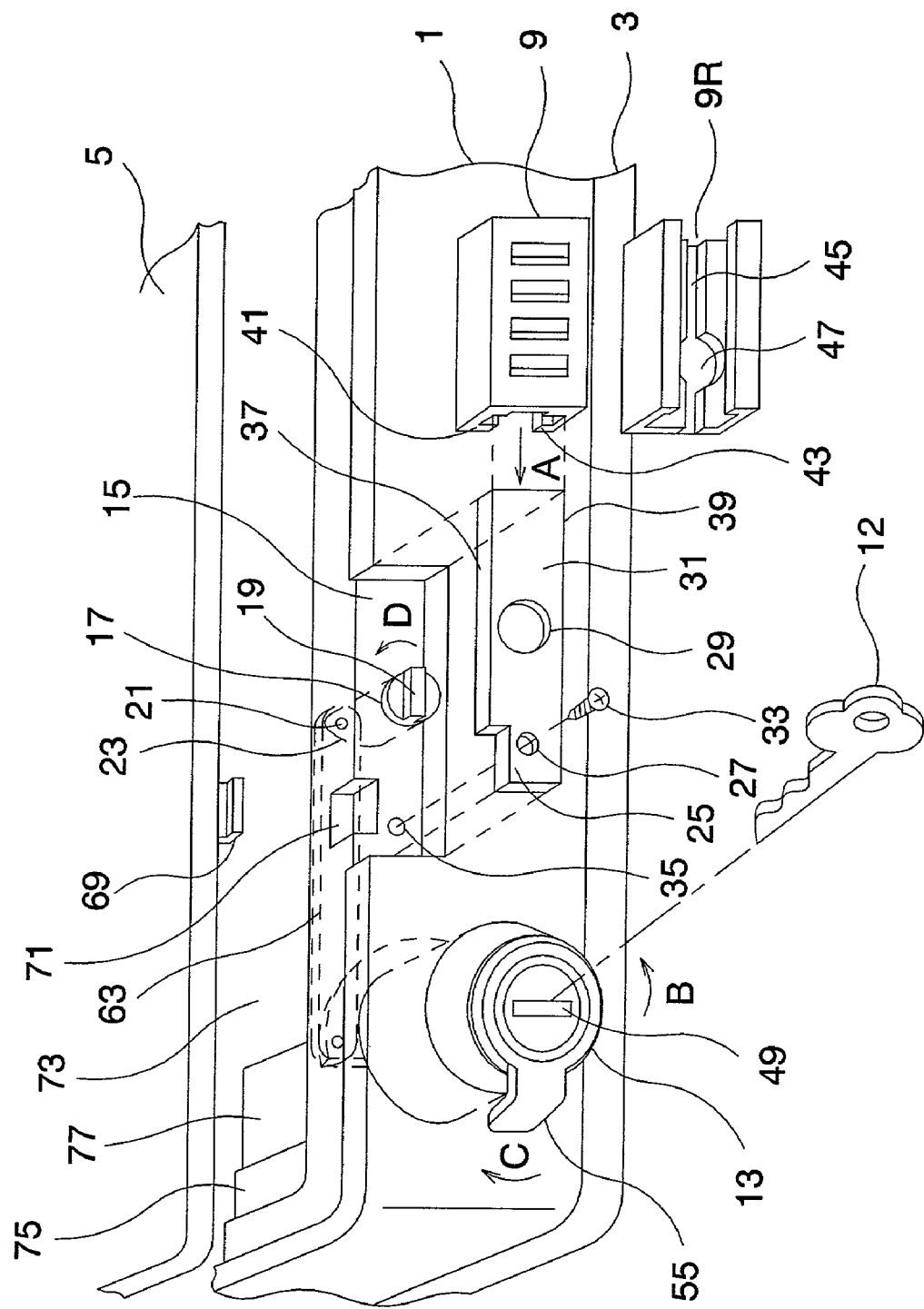
FIG. 2 is an essential magnified perspective exploded view of the information terminal.
Figure 3:
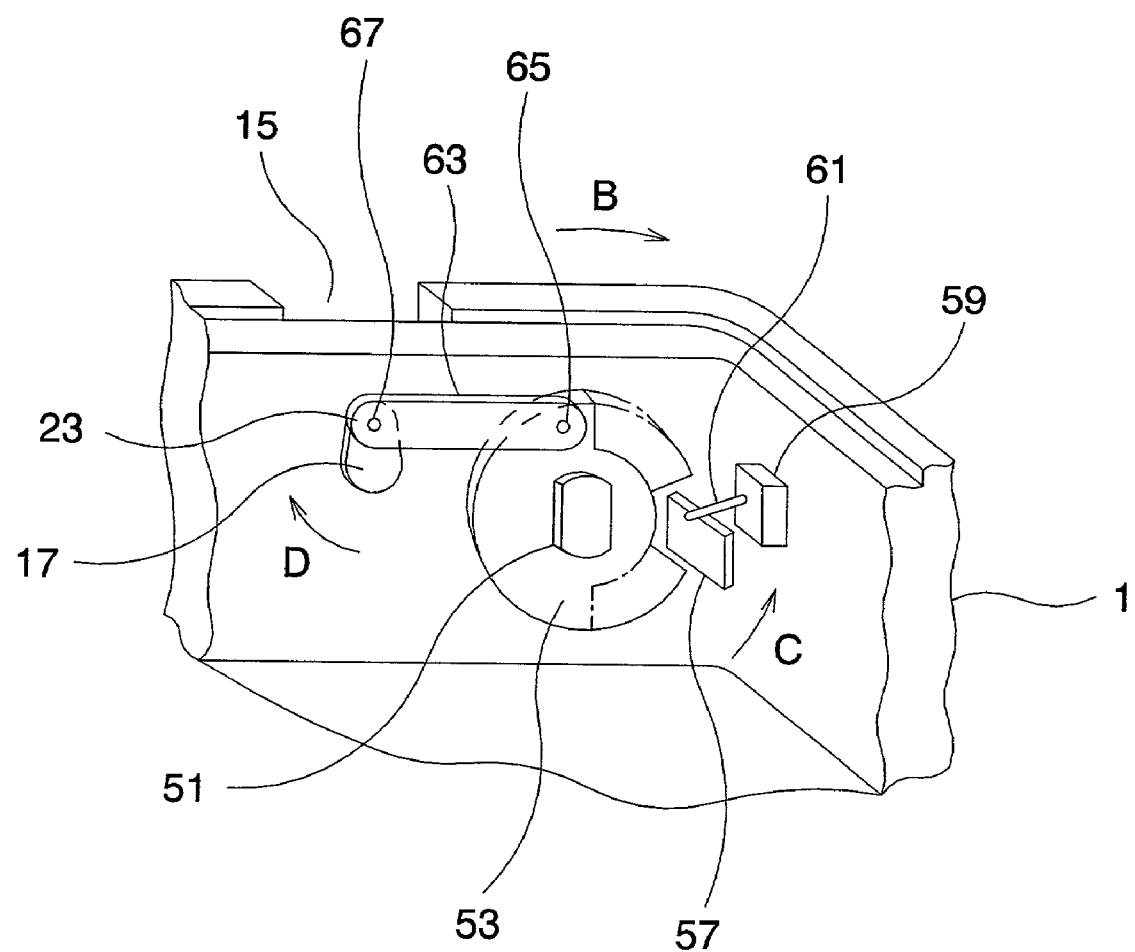
FIG. 3 is an essential magnified perspective view of the information terminal as seen from the opposite side of FIG. 2.

Referring to the drawings, an information terminal according to exemplary embodiment 1 of the present invention as a laptop computer will be explained. FIG. 1 is a perspective bottom view of an information terminal according to exemplary embodiment 1 of the present invention. FIG. 2 is an essential magnified perspective exploded view of the information terminal. FIG. 3 is an essential magnified perspective view of the information terminal as seen from the opposite side of FIG. 2.

In FIG. 1, in a case 1, a liquid crystal display unit is usually disposed, and a lid 3 opening downward in the diagram with a hinge (not shown) is provided. In the center of the front side of the case 1, a carrying handle 7 is attached. At the front side of the bottom, a bottom lid 5 is locked with slide lock devices 9 and 11. At the left side of the handle 7, a cylinder lock 13, a locking device to be locked and unlocked with a key 12, is provided. The slide lock device 9 usually moves manually to the left, and the slide lock device 11 moves manually to the right, so that the bottom lid 5 can be opened.

In FIG. 2, a first recess 15 is provided at the bottom side of the case 1. A rotation arresting shaft 17 is rotatably projecting nearly from the center of the recess by penetrating through the side wall at a right angle. An arresting part 19 at the front leading end of the shaft extends in the horizontal direction as illustrated. At the opposite side (inner side of the case 1) of the arresting part 19, a lever unit 23 having a pin hole 21 is formed on the rotation arresting shaft 17.

At the first recess 15, a guide plate 31 is fixed at a hole 35 of the first recess 15 with a screw 33 passing through the screw hole 27. The guide plate 31 has a notch 25, a screw hole 27, and a round hole 29 through which the rotation arresting shaft 17 penetrates. A cross section of the guide plate 31 in the vertical direction has an inverted convex form narrower at the side contacting with the first recess 15. That is, parallel upper and lower ends at the front side of the figure form guide rails 37, 39.

The slide lock device 9 is inserted onto the guide plate 31 in the direction of an arrow A from the right side prior to being mounted at the first recess 15. The slide lock device 9 has an arresting part 41 and a guide part 43 provided in the lateral direction above and below to be fitted to the guide rails 37, 39, respectively, and is inserted onto the guide plate 31 to slide right and left.

The slide lock device 9R is a rear side view of the slide lock device 9. A groove 45 extends to an inside in the longitudinal direction, and a lock part 47 expands in a circular form in the middle. The arresting part 19 of the rotation arresting shaft 17 is put into the groove 45. When the arresting part 19 rotates at the middle of the lock part 47 by 90 degrees from the state shown in the diagram, the arresting part 19 becomes long in the vertical direction, and arrests movement of the slide lock device 9 (9R) in the lateral direction.

In FIG. 2 and FIG. 3, a key hole 49 is formed in the cylinder lock 13. The key 12 inserted into the hole and rotated by 90 degrees in the direction of an arrow B rotates a shaft 51 together with the key hole 49. And a cam plate 53 formed integrally with the shaft 51 is also rotated to changed a locking state. The cam plate 53 also operates as a power source locking device. The key 12 can be preferably removed from the key hole 49 in both the locked state and the unlocked state.

A power source lever 55 can be turned by about 30 to 45 degrees in the direction of an arrow C coaxially with the shaft 51. When the power source lever 55 turns, an extension lever 57 formed integrally therewith also turns to push up an actuator 61 of a power switch 59, and turns the power switch 59 on. The rotation is limited depending on the position of the cam plate 53.

Herein, the actuator 61 of the power switch 59 pushed up turns the power switch on. In the personal computer conforming to the ATX standard, when the actuator 61 is first pushed up, the power switch is turned on, and when the actuator 61 is pushed up next time, the power switch is turned off. That is, the power switch 59 can operate to change a state of the present terminal for the power source sequentially to another state.

The power source lever 55, extension lever 57, power switch 59, and actuator 61 are together called a power switch device. The power switch device may include a circuit operating to change a present terminal state of the power source sequentially to another state with every operation of the actuator 61. The cam plate 53 and the lever 23 of the rotation arresting shaft 17 are coupled with a coupling rod plate 63 and pins 65, 67. The rotation arresting shaft 17 rotates by 90 degrees in the direction of an arrow D by the coupling rod plate 63 according to the rotation of the cam plate 53 by 90 degrees in the direction of an arrow B. The rotation arresting shaft 17, coupling rod plate 63, and others are together called an interlocking lock-mechanism.

At the end of the bottom lid 5, an arrested part 69 projects downward in an L-form, is inserted into a second recess 71 formed in the first recess 15, and is arrested by the arresting part 41 of the slide lock device 9. The slide lock devices 9, 11, guide plate 31, and arrested part 69 are together called a lid locking device. The end face of the side confronting the end face attached to the arrested part 69 of the bottom lid 5 may be latched by an inserting as usual or affixed with the case 1 with a hinge or the like.

In the inside 73 of the case 1, a card socket 75 is disposed to load a SIM card 77 as a memory device.

Operation of the information terminal having such configuration will be explained below. While the bottom lid 5 opens, the SIM card 77 can be loaded and unloaded in and from the card socket 75 at the inside 73. While the bottom lid 5 is closed, and while the slide lock device 9 is manually slid in the direction of an arrow A, the arrested part 69 is arrested by the arresting part 41. The slide lock device 11 similarly operates to fix the bottom lid 5.

The key 12 is inserted into the key hole 49 and turned by 90 degrees in the direction of an arrow B until stopped in order to lock the cylinder lock 13. Further, the cam plate 53 cooperating integrally with the shaft 51 is turned by 90 degrees in the direction of an arrow B to be located at the position indicated by a single dot chain line. Therefore, the extension lever 57 cannot move in the direction of an arrow C. Therefore, the power source lever 55 cooperating with the lever cannot be manipulated, so that the power switch 59 cannot be turned on by the actuator 61 moving upward. Hence, any third party cannot manipulate the terminal to use a communication function without permission and to disguise and steal data.

Simultaneously, the cam plate 53 upon being turned, rotates the rotation arresting shaft 17 by 90 degrees in the direction of an arrow D through the coupling rod plate 63. Therefore, the arresting part 19 becomes longer in the vertical direction within the lock part 47 of the groove 45. As a result, the slide lock device 9 is prevented from sliding in the lateral direction, and the arrested part 69 remains held in the arresting part 41. Therefore, any third party cannot steal the inside memory by opening the bottom lid 5. This is the locked state. When the key 12 is removed from the cylinder lock 13 at this state, any third party not having the key cannot manipulate the information terminal or cannot open the back lid.

To unlock it, the key 12 is inserted into the key hole 49, and turned by 90 degrees in the direction of an arrow C until stopped, so that the cylinder lock 13 is unlocked. In the reverse operation to the above case, the power source lever 55 can turn, the power switch 59 can be turned on, and the slide lock device 9 can be slid, so that the bottom lid 5 can be opened.

The key 12, upon being inserted and turned in the direction of an arrow C, once unlocks the cylinder lock 13. Then, the power source lever 55, upon being turned in the direction of an arrow C presses the actuator 61 of the power switch 59 through the extension lever 57, thereby turning on the power source of the laptop computer, i.e., the information terminal. Then, upon being turned in the direction of an arrow B, the key 12 locks the cylinder lock 13, and then, key 12 can be pulled out. As a result, while the laptop computer is turned on, the power source lever 55 cannot be turned again in the direction of the arrow C, so that the power source cannot be turned off. In a computer conforming to the ATX standard, when the power switch is manipulated again while the computer is turned on, the power is turned off. Hence, the computer is prevented from destruction or elimination of data being entered by an intentional or accidental power-off operation by the power source lever 22. This is an effective function for preventing loss of data by an incorrect operation in an exhibition hall or show room attended by unspecified multiple people.

In the embodiment, the SIM card is loaded in the bottom lid 5. A hard disk device, battery, wireless circuit board or the like can be also accommodated.

Thus, according to the embodiment, locking the cylinder lock the locking device disables an on/off operation of the power switch and prevents the bottom lid from being opened. Therefore, the information terminal cannot be manipulated by a third party, and the SIM card or other important parts accommodated in the bottom lid can be protected from theft. The terminal can be locked from being turned on and prevented from being turned off by a third party not having the key. The terminal itself can be made safe from theft, not explained herein, with an arresting part (not shown) provided on the case fixed to the desk or the like with a wire or the like.

Embodiment 2

Figure 4:
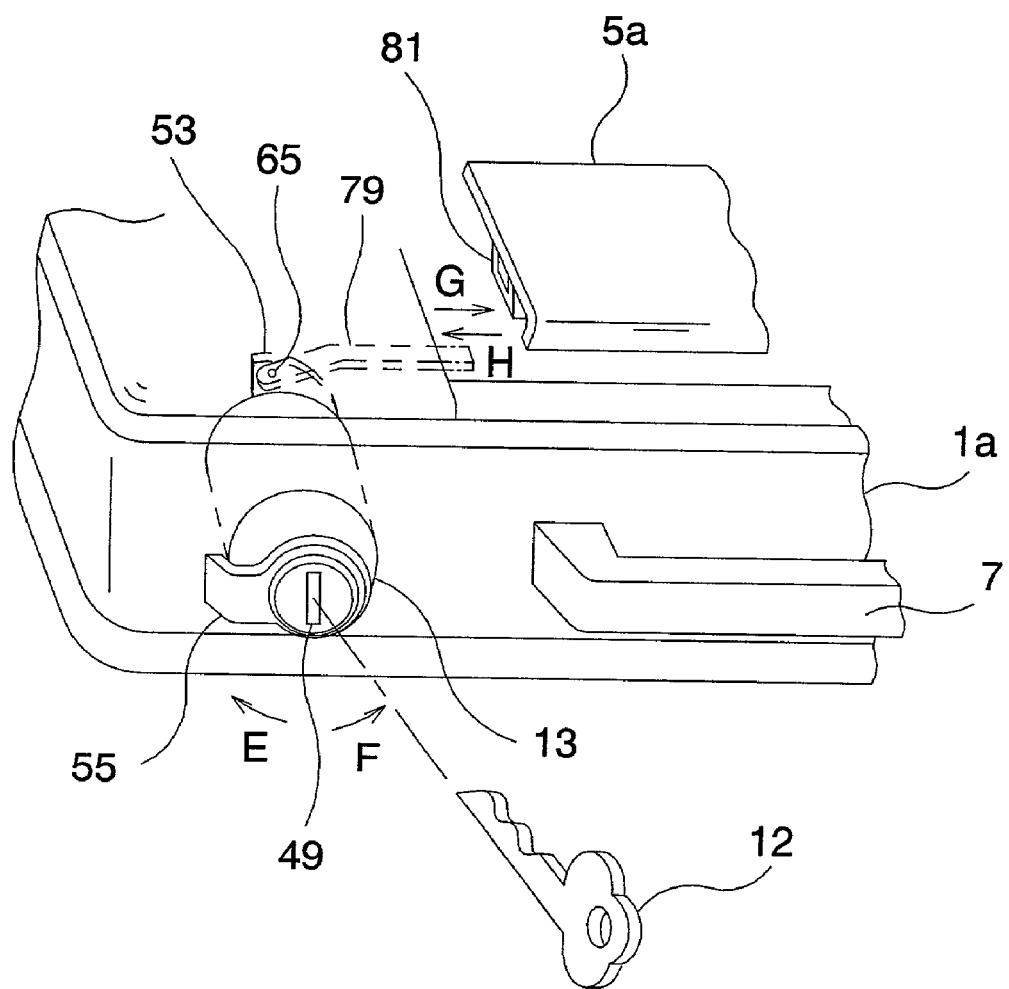
FIG. 4 is a perspective bottom view of an information terminal according to exemplary embodiment 2 of the invention.

Referring to FIG. 4, an information terminal according to exemplary embodiment 2 of the present invention will be explained as a laptop computer. In the perspective bottom view of the information terminal in FIG. 4, the same parts as in embodiment 1 are denoted by the same reference numerals, and the explanation is simplified. A lock lever 79 is coupled with a pin 65 to a cam plate 53 formed integrally with a shaft 51 of a cylinder lock 13. The guide mechanism is omitted for simplicity. The terminal is set in a locked state when the key is inserted in a key hole 49 and turned 90 degrees in the direction of an arrow E from the shown position. The lock lever 79 projects in the direction of an arrow G and is inserted into a locking part 81 provided in a bottom lid 5a to arrest movement of the bottom lid 5a. Herein, the lock lever 79 functions as an interlocking lock-mechanism. Under this state, a power source lever 55 cannot be turned, and the power switch cannot be turned on.

For unlocking it, the key is inserted in the key hole 49 and turned 90 degrees in the direction of an arrow F, and the lock lever 79 is pulled in the direction of an arrow H. Thus, the bottom lid 5a can be removed, and the power source lever 55 can be turned.

In embodiment 1, the bottom lid 5 is locked indirectly by arresting the slide lock device 9 allowing the bottom lid 5 to be fixed and opened. In embodiment 2, the bottom lid 5a itself is locked directly.

These embodiments are only examples, and constituent elements for composing these embodiments may be replaced by other parts having similar functions including known components. For example, the locking device in the embodiments is mechanically operated with a key, but this may be replaced by a cipher number. In entering a cipher number electronically through numeric keys, for example, when the numbers are matched, the device may be unlocked with an electromagnetic force.

Described values are only examples and not limited. For example, the key is turned by 90 degrees, but the angle is not limited to 90 degrees only.

In these embodiments, the communication system is the GSM system, and the SIM card is used. But the wireless communication system is not limited to it, and the embodiments are applied in all other methods using similar ID cards and vulnerable to theft problems. The embodiments are applied to the memory device, but may be applied to other devices for not only storing data, but also operating stored data by incorporated programs and an operation unit.

The embodiments are explained with a laptop computer, but are applied to information terminals including a desktop computer incorporating a wireless communication function and a small portable information terminal having a wireless communication function used for the same purpose generally known as a personal digital assistant (PDA).

As explained herein, in the information terminal of the invention, the locking device set to a locked state disables a power switch-on operation and prevents the bottom lid from being opened. Therefore, the information terminal cannot be handled by any third party, and at least a card storing information such as the SIM card incorporated in the bottom lid, hard disk, battery, wireless circuit parts and other important components can be protected from theft.

In this information terminal, in relation to a manipulation in the locked state, the power switch-on operation and a change from the on-state to an off-state can be disabled. Therefore, the information terminal is prevented from a manipulation, destruction, and erasure of data by a third party.

What is claimed is:
1. An information terminal comprising:
  a case having a memory device accommodating section for accommodating a detachable memory device;
  a locking device fixed to said case and being changeable between a locked state and an unlocked state by a lock manipulation part, said locking device remaining fixed to said case in both said locked state and said unlocked state;
  a lid, movable between an open state and a closed state, for covering said memory device accommodating section and preventing removal of the detachable memory device from said memory device accommodating section when in the closed state; and
  an interlocking lock mechanism operably interlocked with said locking device for retaining said lid in said closed state when said locking device is in said locked state, and for allowing opening of said lid when said locking device is in said unlocked state;
  wherein said locking device comprises a cylinder lock having a rotatable shaft; and
  wherein said interlocking lock mechanism comprises an elongated coupling rod plate coupled to said rotatable shaft so as to be moved in a lengthwise direction of said coupling rod plate upon rotation of said rotatable shaft, an arresting shaft operably coupled with said lid locking mechanism and rotatable between an arresting position in which said lid locking mechanism is prevented from being unlocked manually and a non-arresting position, and a lever unit coupling said arresting shaft to said coupling rod plate such that said arresting shaft is rotated upon movement of said coupling rod plate in said lengthwise direction.

2. The information terminal of claim 1, wherein said interlocking lock mechanism locks said lid directly when changed from sad unlocked state to said locked state.

3. The information terminal of claim 1, further comprising a lid locking mechanism for locking and unlocking said lid manually, said interlocking lock mechanism being operable, in said locked state, to lock said lid to prevent said lid locking mechanism from being unlocked manually.

4. The information terminal of claim 1, wherein said lid has a locking part; and
said interlocking lock mechanism comprises an elongated lock lever coupled to said rotatable shaft so as to be moved in a lengthwise direction of said lock lever upon rotation of said rotatable shaft between a locking position and an unlocking position, said lock lever being engageable, when in said locking position, with said locking part of said lid to retain said lid in said closed state.

5. The information terminal of claim 1, further comprising a wireless communication function for communicating externally, said wireless communication function including the detachable memory device; and
wherein said detachable memory device comprises a subscriber identity module (SIM) card.

6. An information terminal comprising:
  a case having a memory device accommodating section for accommodating a detachable memory device;
  a locking device mounted to said case and being changeable between a locked state and an unlocked state by a lock manipulation part;
  a lid, movable between an open state and a closed state, for covering said memory device accommodating section and preventing removal of the detachable memory device from said memory device accommodating section when in the closed state; and
  an interlocking lock mechanism operably interlocked with said locking device for retaining said lid in said closed state when said locking device is in said locked state, and for allowing opening of said lid when said locking device is in said unlocked state;

a lid locking mechanism for locking and unlocking said lid manually, said interlocking lock mechanism being operable, in said locked state of said locking device, to lock said lid to prevent said lid locking mechanism from being unlocked manually;

wherein said interlocking lock mechanism comprises a member extending away from said locking device such that a position at which said interlocking lock mechanism engages said lid when retaining said lid in said closed state is remote from said locking device;

wherein said locking device comprises a cylinder lock having a rotatable shaft; and wherein said member of said interlocking lock mechanism comprises an elongated coupling rod plate coupled to said rotatable shaft so as to be moved in a lengthwise direction of said coupling rod plate upon rotation of said rotatable shaft, and said interlocking lock mechanism further includes an arresting shaft operably coupled with said lid locking mechanism and rotatable between an arresting position in which said lid locking mechanism is prevented from being unlocked manually and a non-arresting position, and a lever unit coupling said arresting shaft to said coupling rod plate such that said arresting shaft is rotated upon movement of said coupling rod plate in said lengthwise direction.

7. The information terminal of claim 6, wherein
said interlocking lock mechanism locks said lid directly when changed from sad unlocked state to said locked state.

8. The information terminal of claim 6, wherein
said lid has a locking part; and
said member of said interlocking lock mechanism comprises an elongated lock lever coupled to said rotatable shaft so as to be moved in a lengthwise direction of said lock lever upon rotation of said rotatable shaft between a locking position and an unlocking position, said lock lever being engageable, when in said locking position, with said locking part of said lid to retain said lid in said closed state.

9. The information terminal of claim 6, further comprising
a wireless communication function for communicating externally, said wireless communication function including the detachable memory device; and
wherein said detachable memory device comprises a subscriber identity module (SIM) card.

10. An information terminal comprising:
a case having a memory device accommodating section for accommodating a detachable memory device;
a power switch mounted to said case for enabling at least one of powering said information terminal on and powering said information terminal off;
a locking device mounted to said case and being changeable, by a lock manipulation part, between a locked state in which said locking device prevents said power switch from being operated, and an unlocked state in which said locking device allows said power switch to be operated;

a lid, movable between an open state and a closed state, for covering said memory device accommodating section and preventing removal of the detachable memory device from said memory device accommodating section when in the closed state; and an interlocking lock mechanism operably coupled to both said locking device and said lid such that, upon changing of said locking device to said locked state when said lid is in said closed state, said lid is locked in said closed state and said power switch is prevented from being operated, and such that upon changing of said locking device to said unlocked state when said lid is in said closed state, said lid can be opened to said open state and said power switch can be operated.

11. The information terminal of claim 10, wherein
said interlocking lock mechanism locks said lid directly when changed from said unlocked state to said locked state.

12. The information terminal of claim 10, further comprising
a lid locking mechanism for locking and unlocking said lid manually, said interlocking lock mechanism being operable, in said locked state, to lock said lid to prevent said lid locking mechanism from being unlocked manually.

13. The information terminal of claim 12, wherein
said locking device comprises a cylinder lock having a rotatable shaft; and
said interlocking lock mechanism comprises an elongated coupling rod plate coupled to said rotatable shaft so as to be moved in a lengthwise direction of said coupling rod plate upon rotation of said rotatable shaft, an arresting shaft operably coupled with said lid locking mechanism and rotatable between an arresting position in which said lid locking mechanism is prevented from being unlocked manually and a non-arresting position, and a lever unit coupling said arresting shaft to said coupling rod plate such that said arresting shaft is rotated upon movement of said coupling rod plate in said lengthwise direction.

14. The information terminal of claim 13, wherein
said lid has a locking part; and
said interlocking lock mechanism comprises an elongated lock lever coupled to said rotatable shaft so as to be moved in a lengthwise direction of said lock lever upon rotation of said rotatable shaft between a locking position and an unlocking position, said lock lever being engageable, when in said locking position, with said locking part of said lid to retain said lid in said closed state.

15. The information terminal of claim 10, further comprising
a wireless communication function for communicating externally, said wireless communication function including the detachable memory device; and
wherein said detachable memory device comprises a subscriber identity module (SIM) card.

* * * * *

UNITED STATES PATENT AND TRADEMARK OFFICE
CERTIFICATE OF CORRECTION

PATENT NO.         : 7,024,566 B2
APPLICATION NO. : 09/940632
DATED              : April 4, 2006
INVENTOR(S)       : Yoshiyuki Shiwaku et al.

It is certified that error appears in the above-identified patent and that said Letters Patent is hereby corrected as shown below:

Col. 6 claim 2, line 3, "sad" should be --said--.

Col. 7 claim 7, line 3, "sad" should be --said--.

Signed and Sealed this

Twenty-second Day of August, 2006

JON W. DUDAS
*Director of the United States Patent and Trademark Office*